Patented May 18, 1926.

1,585,128

UNITED STATES PATENT OFFICE.

WILLIAM J. SMITH, OF DENVER, COLORADO, ASSIGNOR OF ONE-HALF TO VINCENT H. CONNOLE, OF DENVER, COLORADO.

METHOD FOR SALTING AND ROASTING NUTS.

No Drawing.　　　Application filed September 26, 1922.　Serial No. 590,675.

The object of this invention is to provide an efficient method for salting nuts, particularly peanuts, almonds and the like, in the shell and for also roasting the nuts in the shell as a part of the same process if desired.

Briefly, the invention consists in introducing through the walls of the porous shell and into the interior thereof a saline solution by mechanical means such as vacuum and pressure, and roasting the nuts in the shell in the same chamber with superheated steam. If preferred however the nuts may be removed and roasted in some other manner. The invention may be applied to shelled nuts in like manner.

Heretofore, in efforts to salt nuts within the shell, attempts have been made to force a salt solution through the shell by pressure and then place the nuts in a roaster for removal of the water during the initial stages of the roasting step. This however has required an unduly long period of treatment in the roaster, and since the nuts must be tumbled to prevent burning, the shells have become badly damaged; moreover this treatment has caused the kernels to become more or less powdered, thus producing a poor product of small market value. These difficulties are entirely overcome by the present process.

By the present invention, the nuts are placed in an air tight tank and put under a vacuum approximating twenty inches of mercury. Brine of suitable strength is then introduced into the tank in quantity sufficient to cover all the nuts. The vacuum is then released, with the result that some of the saline solution is drawn through the porous shells of the nuts and into contact with the kernels therein. Introduction of the brine into the tank is continued until a desired pressure (for example fifteen pounds) is obtained, which pressure assists the passage of the solution into the interiors of the nut kernels, and insures complete release of the vacuum and maximum penetration of the brine.

The surplus brine about the nuts is then allowed to drain off, leaving the nuts filled or largely filled with the brine. Steam is then introduced into the tank and around the nuts and this treatment continued at a temperature and for a length of time sufficient to cause evaporation of the water within the shells so as to leave the salt carried thereby within and about the kernels. The steam may be and preferably will be superheated, and may be introduced at atmospheric or other desired pressure.

After the evaporation of the water, the nuts preferably will be allowed to remain in the tank in the presence of superheated steam. The hot dry steam so furnished will be introduced at such temperature and pressure as will insure roasting the nuts in their shells. Thus the nuts are salted, dried and roasted in their shells in one continuous operation. Shelled nuts may be treated in the same manner.

This process completely roasts every kernel to the required marketable condition, and insures desired saturation of every kernel with salt.

The process might also be employed for treating other food stuffs, and for introducing other flavoring substances including sugar.

I claim:

1. A process comprising placing nuts in the shell under vacuum, introducing brine thereto, applying pressure, drawing off the surplus brine, steaming to evaporate the water in and upon the shells of the nuts, and roasting the nuts within their shells with superheated steam, all in one continuous operation.

2. A continuous process for nuts comprising placing nuts in the shell under vacuum, introducing brine thereto, applying pressure whereby the brine enters through the shells of the nuts, and introducing steam to dry the nuts and roast them in their shells.

3. A process for nuts in the shell comprising introducing brine into the interior of the shells, and roasting the nuts in the shells with superheated steam.

In testimony whereof I affix my signature.

WM. J. SMITH.